United States Patent
Lee et al.

(10) Patent No.: US 10,771,139 B2
(45) Date of Patent: Sep. 8, 2020

(54) APPARATUS AND METHOD FOR PROVIDING EFFICIENT BEAMFORMING FEEDBACK

(71) Applicant: Samsung Electronics Co., Ltd., Gyeonggi-do (KR)

(72) Inventors: Wook Bong Lee, San Jose, CA (US); Minyoung Park, San Ramon, CA (US); Tianyu Wu, Fremont, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/404,281

(22) Filed: May 6, 2019

(65) Prior Publication Data

US 2019/0372638 A1    Dec. 5, 2019

Related U.S. Application Data

(60) Provisional application No. 62/679,148, filed on Jun. 1, 2018.

(51) Int. Cl.
*H04B 7/06* (2006.01)
*H04B 7/0426* (2017.01)

(52) U.S. Cl.
CPC .......... *H04B 7/0617* (2013.01); *H04B 7/043* (2013.01); *H04B 7/0634* (2013.01); *H04B 7/0639* (2013.01)

(58) Field of Classification Search
CPC .. H04B 7/0617; H04B 7/0417; H04B 7/0413; H04B 7/0619; H04B 7/0634
See application file for complete search history.

(56) References Cited

U.S. PATENT DOCUMENTS

| | | | |
|---|---|---|---|
| 7,961,802 B2 | 6/2011 | Li et al. | |
| 9,918,240 B2 | 3/2018 | Lee et al. | |
| 9,985,708 B2 | 5/2018 | Shapira et al. | |
| 2016/0330732 A1* | 11/2016 | Moon | H04B 7/0617 |
| 2017/0324455 A1* | 11/2017 | Soriaga | H04L 25/0202 |

(Continued)

FOREIGN PATENT DOCUMENTS

WO   WO 2017/021774   2/2017

*Primary Examiner* — David S Huang
(74) *Attorney, Agent, or Firm* — The Farrell Law Firm, P.C.

(57) ABSTRACT

An apparatus for a beamformee and a method are provided. The apparatus includes a first beamforming matrix device configured to generate a first beamforming matrix $V_{WB}$ from a channel H; an equivalent channel device configured to generate an equivalent channel $\hat{H}_k$ based on the channel H and the first beamforming matrix $V_{WB}$, where k is a number that indicates a subcarrier index; a second beamforming matrix device configured to obtain a second beamforming matrix $V_{SC}$ from the equivalent channel $\hat{H}_k$; and a transmitter configured to transmit the first beamforming matrix $V_{WB}$ and the second beamforming matrix $V_{SC}$.

20 Claims, 5 Drawing Sheets

(56) References Cited

U.S. PATENT DOCUMENTS

2018/0006696 A1\* 1/2018 Yue .................... H04W 72/046
2018/0083676 A1    3/2018 Wei et al.
2019/0341975 A1\* 11/2019 Yun .................... H04B 7/0417

\* cited by examiner

APPARATUS AND METHOD FOR PROVIDING EFFICIENT BEAMFORMING FEEDBACK

PRIORITY

This application claims priority under 35 U.S.C. § 119(e) to a U.S. Provisional Patent Application filed on Jun. 1, 2018 in the United States Patent and Trademark Office and assigned Ser. No. 62/679,148, the entire contents of which are incorporated herein by reference.

FIELD

The present disclosure relates generally to a wireless-fidelity (Wi-Fi) system, and more particularly, to an apparatus and method for providing beamforming feedback.

BACKGROUND

In a conventional wireless communication system, it is important to have a strong communication signal. In particular, the greatest possible signal-to-noise ratio (SNR) is desired at a receiver end. Similarly, for a Wi-Fi system, increasing the SNR at the receiving device increases the probability that frames are correctly received and reduces the amount of retransmissions necessary from the source. Some methods of achieving better SNR at the receiver end is to increase transmit power, decrease the distance between the source and the receiver, and increase antenna gain.

In Wi-Fi, non-compressed beamforming and compressed beamforming may be used. Compressed beamforming reduces the amount of feedback. In addition, Wi-Fi introduced group feedback, i.e., feedback only once in an Ng group of subcarriers, where Ng represents a number of subcarriers in a subcarrier group. In long term evolution/new radio (LTE/NR), two step beamforming is used to reduce overhead, where one matrix is used with wideband and another matrix is used with a subband.

In a conventional Wi-Fi system, beamforming increases antenna gain while maintaining omnidirectional coverage, which results in increased SNR and more stable, higher bandwidth Wi-Fi connections by focusing transmissions to the recipient. These benefits are achieved by transmitting a signal via an array of antennas and slightly altering the phase of the signal at each antenna in the array. For example, the Institute of Electrical and Electronics Engineers (IEEE) 802.11 ac standard (i.e., a wireless networking standard in the 802.11 family, developed by the IEEE Standards Association) provides a protocol for calibrating an array of antennas to direct a signal to any point covered under omnidirectional propagation. A beamformer is a device that augments the phase shift of antennas to produce a gain in a desired direction. A beamformee is a device that is a target of a beamformer. The beamformee participates in the establishment of the beam, but does not augment timings of its antennas.

In the IEEE 802.11 ac standard, a compressed beamforming report is generated per user, based on a singular value decomposition (SVD) of the channel. After obtaining a beamforming matrix, the beamforming matrix is compressed using multiplications of diagonal matrices and Givens rotation matrices, where $H(k)$ is an $N_r \times N_t$ channel matrix on a subcarrier k, $N_r$ is a number of receive antennas, and $N_t$ is a number of transmit antennas. The channel matrix is first estimated at the receiver by frequency domain channel estimation based on a received long training field (LTF). SVD is then applied on the estimated channel matrix, which results in Equation (1) as follows:

$$H(k)=U(k)\cdot S(k)\cdot V^*(k) \quad (1)$$

where $S(k)$ is a diagonal singular value matrix containing singular values in a decreasing order on the diagonal of the singular value matrix, $U(k)$ is a left singular matrix containing left singular vectors in corresponding order, and $V(k)$ is a right singular matrix containing right singular vectors in the same order. The matrix $V(k)$ of size $N_t \times N_r$ is semi-unitary.

SVD-based single user beamforming in the IEEE 802.11 ac standard requires that the right singular matrix be decomposed, quantized, and then fed back to the transmitter for efficient transmit beamforming. The matrix V may be decomposed in Equation (2) as follows:

$$V=[\Pi_{i=1}^{min(N_c,N_r-1)}[D_i(1_{i-1}e^{j\phi_{1,i}}\ldots e^{j\phi_{N_r-1,i}}1)\\ \Pi_{l=i+1}^{N_r}G_{li}^T(\Psi_{li})]]\tilde{I}_{N_r \times N_c} \quad (2)$$

Conventional Wi-Fi feedback provides quantization for each subcarrier, which results in a large increase in the amount of feedback as the number of antennas increases. Next generation Wi-Fi will have a large number of antennas. Thus, the amount of feedback will increase significantly if a conventional feedback mechanism is used.

SUMMARY

According to one embodiment, an apparatus of a beamformee is provided. The apparatus of the beamformee includes a channel estimator configured to estimate a channel H, where the channel H is a wideband channel; a wideband beamforming matrix device configured to generate a wideband beamforming matrix $V_{WB}$ from the channel H; an equivalent channel device configured to generate an equivalent channel $\tilde{H}_k$ based on the channel H and the wideband beamforming matrix $V_{WB}$, where k is a number that indicates a subcarrier index; a subcarrier beamforming matrix device configured to obtain a subcarrier beamforming matrix $V_{SC}$ from the equivalent channel $\tilde{H}_k$; and a transmitter configured to transmit the wideband beamforming matrix $V_{WB}$ and the subcarrier beamforming matrix $V_{SC}$.

According to one embodiment, a method is provided. The method includes estimating, by a beamformee, a channel H, where the channel H is a wideband channel; determining, by the beamformee, a wideband beamforming matrix $V_{WB}$ from the channel H; determining, by the beamformee, an equivalent channel $\tilde{H}_k$ based on the channel H and the wideband beamforming matrix $V_{WB}$, where k is a number that indicates a subcarrier index; obtaining, by the beamformee, a subcarrier beamforming matrix $V_{SC}$ from the equivalent channel $\tilde{H}_k$; and transmitting, by the beamformee, to a beamformer, the wideband beamforming matrix $V_{WB}$ and the subcarrier beamforming matrix $V_{SC}$.

According to one embodiment, a method is provided. The method includes determining, by the beamformee, a beamforming matrix from a channel H; determining, by the beamformee, an equivalent channel $\tilde{H}_k$ based on the channel H and the beamforming matrix, where k is a number that indicates a subcarrier index; obtaining, by the beamformee, a subcarrier beamforming matrix from the equivalent channel $\tilde{H}_k$; and transmitting, by the beamformee, to a beamformer, the beamforming matrix and the subcarrier beamforming matrix.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
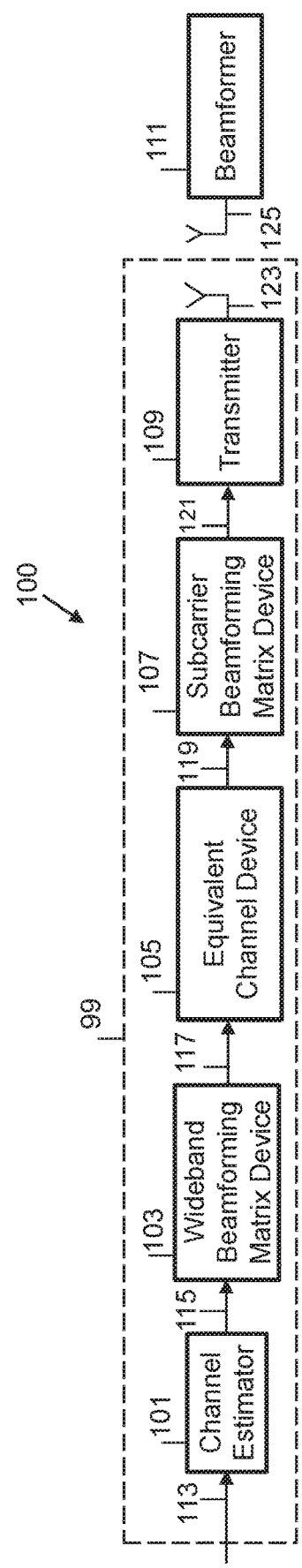
FIG. 1 is a block diagram of an apparatus for beamforming feedback, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

In a next generation Wi-Fi system, it may be desired to support a larger frequency (e.g., 320 megahertz (MHz)) and a larger number of antennas (e.g., 16). If the compressed beamforming method is used, then feedback overhead may be an issue. Table 1 below illustrates examples of IEEE 802.11 ac standard compressed beamforming feedback sizes.

TABLE 1

| Size of V (Nr × Nc) | Number of angles (Na) | Number of feedback bits (80 MHz, codebook (CB) information = 1, Ng = 1) | Number of feedback bits (80 MHz, CB information = 0, Ng = 4) |
|---|---|---|---|
| 2 × 1 | 2 | 2,348 | 380 |
| 2 × 2 | 2 | 2,356 | 388 |
| 8 × 1 | 14 | 16,388 | 2,612 |
| 8 × 2 | 26 | 30,436 | 4,852 |
| 8 × 8 | 56 | 65,584 | 10,480 |

According to one embodiment, hybrid beamforming is employed, where wideband/subband beamforming feedback is combined with subcarrier beamforming feedback with reduced dimension.

According to one embodiment, the present apparatus, by a beamformee, estimates a channel H (e.g., a wideband channel) and determines a wideband beamforming matrix $V_{WB}$ with dimension $N_{TX} \times K$, where $N_{TX}$ is a number of transmit antennas, K is a number that is design parameter for dimension reduction of $V_{WB}$, and $V_{WB}$ is a matrix having K most significant vectors in a right singular matrix for a wideband beamforming matrix. Thus, the space of channel H is projected to its K dimensional principal subspace. Wideband may refer to a whole operational bandwidth or a subband of the operational bandwidth. The width of the wideband is compared to a subcarrier level feedback. Subcarrier beamforming feedback will find a feedback matrix from equivalent channel of reduced dimension $N_{RX} \times K$. It is noted that original dimension of channel is $N_{RX} \times N_{TX}$.

A wideband beamforming matrix is determined by the beamformee from a covariance matrix of a wideband channel. The wideband bandwidth may depend on a channel condition and a multiple-input-multiple-output (MIMO) mode. For a single user (SU), 80 MHz may provide a good result. For multiple users (MU), less than 80 MHz may be required (e.g., 5 or 10 MHz per user). After calculating the covariance matrix, the wideband beamforming matrix may be obtained by a method used in compressed beamforming, e.g., SVD. Then, the $N_{TX} \times K$ wideband beamforming matrix $V_{WB}$ may be quantized based on, for example, compressed beamforming, where K is design parameter (e.g., K=8). K may be determined by a beamformee or a beamformer. For example, in the case of an SU, K may be determined by the beamformee and, in the case of an MU or trigger-based feedback, K may be determined by the beamformer. The tradeoff between complexity and performance analysis affects the choice of K. Various factors include timing, delay spread, side of BW, spatial correlation between antennas.

The present system, by the beamformee, further multiplies a channel H at subcarrier index k (e.g., $H_k$), by $V_{WB}$ and determines an equivalent channel $\tilde{H}_k = H_k V_{WB}$, and then obtains a subcarrier beamforming matrix $V_{SC}$ from the equivalent channel, where $V_{SC}$ is a right singular matrix for an equivalent channel $\tilde{H}_k$ for subcarrier k. Thus, the dimension of the equivalent channel is reduced to $N_{RX} \times K$. After multiplying the channel $H_k$ by $V_{WB}$, each subcarrier's channel dimension is reduced to $N_{RX} \times K$. The remaining procedure may be the same as conventional compressed beamforming of $N_r = K$, where $V_{SC}$ is quantized as a quantized beamforming matrix of $N_r \times Nc$, where Nc is a number of columns in the quantized beamforming matrix.

According to one embodiment, the present apparatus, by the beamformee, feedbacks $V_{WB}$ and $V_{SC}$ from a receiver to a transmitter. Hybrid beamforming herein refers to a combination of using the wideband feedback matrix $V_{WB}$ with subcarrier level feedback matrix $V_{SC}$. For example, a beamformer may reconstruct the wideband beamforming matrix using $V_{WB} \cdot V_{SC}$. For example, when $N_{TX}=8$, Nc=2, Ng=1, BW=80 MHz, codebook (CB) information=1, using the IEEE 802.11 ac standard beamforming method, 8·2+ 234·26·5=16+30, 420=30,436 bits are required. Ng represents a number of subcarriers in a subcarrier group. During beamforming feedback, a beamformee may not feedback every subcarrier, but may feedback for a group of adjacent subcarriers to save overhead. However, for an embodiment of the present system with K=4: 8·2 (SNR)+26·5 ($V_{WB}$)+ 234·10·5($V_{SC}$)=16+130+11,700=11,846 bits are required.

For example, when Ng=4, CB information=0, using the IEEE 802.11 ac standard beamforming method, 4,852 bits are required. However, for an embodiment of the present system with K=4: 8·2 (SNR)+26·3 ($V_{WB}$)+62·10·3($V_{SC}$)= 16+78+1860=1,954 bits are required.

According to one embodiment, the present system provides selection and feedback of $V_{WB}$ using two methods described below. The beamformee may select either of the two methods described below for wide band feedback.

In a first method, one embodiment of the present system uses IEEE 802.11 ac standard compressed beamforming feedback. The present system uses same, similar, or different (e.g., greater) bit size for angle quantization than $V_{SC}$ feedback, and K is the same or greater than Nc of $V_{SC}$.

In a second method, one embodiment of the present system uses a predefined codebook that includes an index of a predefined codebook (PMI), and indices of vectors in an (e.g., oversampled) discrete Fourier transform (DFT) matrix.

According to one embodiment, the present system determines feedback granularity. The present system may apply one or multiple $V_{WB}$ feedback. For one $V_{WB}$ feedback, $V_{WB}$ is wideband. For multiple $V_{WB}$ feedback, $V_{WB}$ is calculated on a subband basis (e.g., subband=242 tone resource units (RUs) as defined in IEEE 802.11 lax standard). Since there is a wideband beamforming matrix/vector available, the present system does not have to feedback all (down sampled: Ng>1) subcarriers' $V_{SC}$. Instead, the present system may feedback a few selected subcarriers, for example, subcarriers in selected 26 tone RUs. In one embodiment, the present system omits feedback of $V_{SC}$.

FIG. 1 is a block diagram of an apparatus 100 for efficient beamforming feedback, according to one embodiment.

Referring to FIG. 1, the apparatus 100 includes a beamformee 99 and a beamformer 111, where the beamformee 99 includes a channel estimator 101, a wideband beamforming matrix device 103, an equivalent channel device 105, a subcarrier beamforming matrix device 107, and a transmitter 109.

The channel estimator 101 includes an input 113 for receiving a signal, and an output 115 for providing an estimate of the received channel, H.

The wideband beamforming matrix device 103 includes an input connected to the output 115 of the channel estimator 101, and an output 117 for providing a wideband beamforming matrix $V_{WB}$ from the channel H. In one embodiment, the wideband beamforming matrix $V_{WB}$ may have dimension $N_{TX} \times K$, where $N_{TX}$ is a number of transmit antennas of the beamformee, and where K is a number. The wideband beamforming matrix $V_{WB}$ may be a matrix having K most significant vectors in a right singular matrix, where K is a number. The wideband beamforming matrix device 103 may determine the wideband beamforming matrix $V_{WB}$ based on a covariance matrix of the channel H. The wideband beamforming matrix device 103 may compute the wideband beamforming matrix $V_{WB}$ by SVD. The wideband beamforming matrix device 103 may quantize the wideband beamforming matrix $V_{WB}$ based on the compressed beamforming method.

The equivalent channel device 105 includes an input connected to the output 117 of the wideband beamforming matrix device 103, and an output 119 for providing an equivalent channel $\tilde{H}_k$. In one embodiment, the equivalent channel $\tilde{H}_k$ may be based on the channel H and the wideband beamforming matrix $V_{WB}$, where k is a number that indicates a subcarrier index. Note that the estimated channel H for the equivalent channel device 105 may be different from the estimated channel H for the wideband beamforming matrix device 103. For example, the estimated channel H for the wideband beamforming matrix device 103 may be determined based on a received signal divided by a reference signal while the estimated channel H for the equivalent channel device 105 may be further improved from the estimated channel H for the wideband beamforming matrix device 103 using signal processing, e.g. channel smoothing. The equivalent channel device 105 may determine the equivalent channel $\tilde{H}_k$ by multiplying $H_k$ by the wideband beamforming matrix $V_{WB}$, where $H_k$ is the channel H at the subcarrier index k. The apparatus may use one reference signal (e.g., one reference signal received at one time from all transmitters).

The subcarrier beamforming matrix device 107 includes an input connected to the output 119 of the equivalent channel device 105, and an output 121 for providing a subcarrier beamforming matrix device $V_{SC}$ obtained from the equivalent channel $\tilde{H}_k$. The subcarrier beamforming matrix device 107 may quantize the subcarrier beamforming matrix $V_{SC}$ as a quantized beamforming matrix of K×Nc, where Nc is a number of columns of the quantized beamforming matrix.

The transmitter 109 includes a first input connected to the output 117 of the wideband beamforming matrix device 103, a second input connected to the output 121 of the subcarrier beamforming matrix device 107, and an antenna 123 for transmitting the wideband beamforming matrix $V_{WB}$ and the subcarrier beamforming matrix $V_{SC}$.

The beamformer 111 includes an antenna 125 for receiving the transmitted wideband beamforming matrix $V_{WB}$ and the subcarrier beamforming matrix $V_{SC}$. The beamformer 111 may construct a beamforming matrix based on the wideband beamforming matrix $V_{WB}$ and the subcarrier beamforming matrix $V_{SC}$. The beamformer 111 may receive a quantized wideband beamforming matrix $V_{WB}$ and a quantized subcarrier beamforming matrix $V_{SC}$ and may construct the beamforming matrix therefrom.

Figure 2:
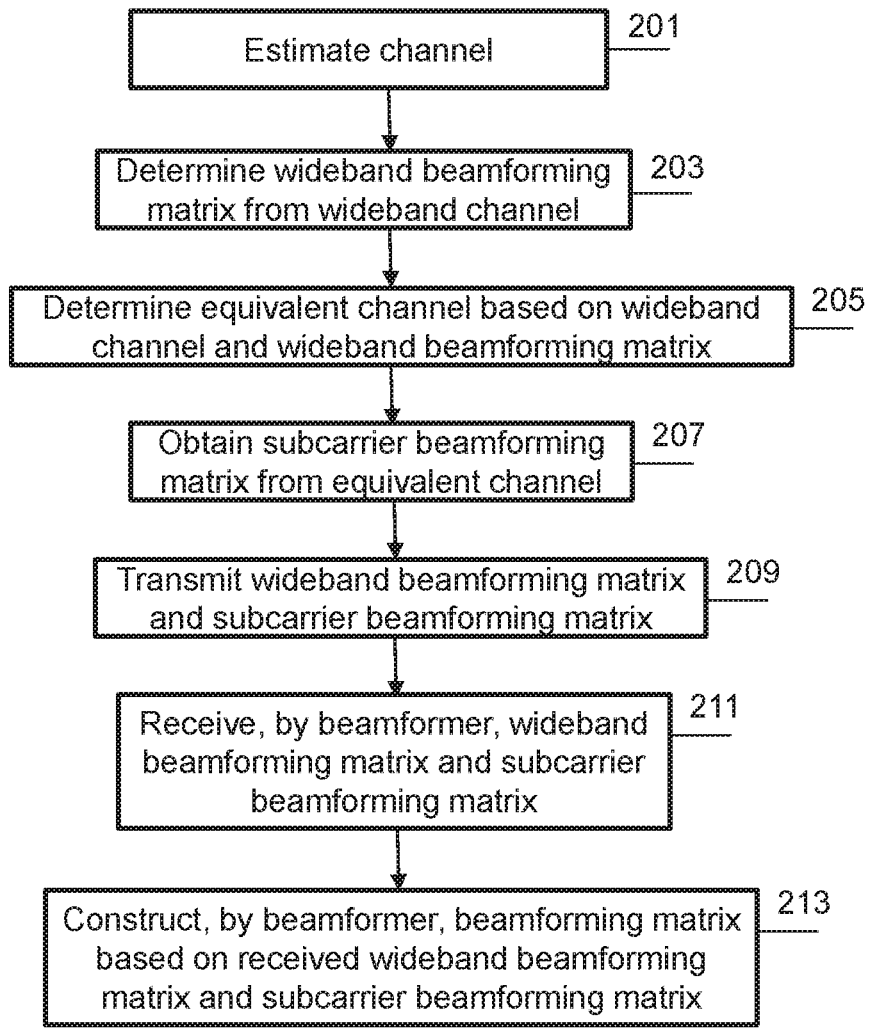
FIG. 2 is a flowchart of a method of beamforming feedback, according to one embodiment.

FIG. 2 is a flowchart of a method of efficient beamforming feedback, according to one embodiment.

Referring to FIG. 2, a beamformee estimates a channel H at step 201. In one embodiment, the channel H may be a wideband channel. The bandwidth of the channel H may depend on a channel condition and a MIMO mode. The beamforming matrix $V_{WB}$ may be quantized based on the averaged covariance matrix of the channel $H_k$.

At 203, the beamformee determines a beamforming matrix $V_{WB}$ from the channel H. In one embodiment, the beamforming matrix $V_{WB}$ may have dimension $N_{TX} \times K$, where $N_{TX}$ is a number of transmit antennas of the beamformer, and where K is a number. The the beamforming matrix $V_{WB}$ may be a matrix having K most significant vectors in a right singular matrix, where K is a number. The beamforming matrix $V_{WB}$ may be determined based on a covariance matrix of the channel H. The beamforming matrix $V_{WB}$ may be quantized based on the covariance matrix of the channel H. The beamforming matrix $V_{WB}$ may be quantized by SVD.

At 205, the beamformee determines an equivalent channel $\tilde{H}_k$ based on the channel H and the beamforming matrix $V_{WB}$, where k is a number that indicates a subcarrier index. In one embodiment, the equivalent channel $\tilde{H}_k$ may be determined by multiplying $H_k$ by the beamforming matrix $V_{WB}$, where $H_k$ is the channel H at the subcarrier index k.

At 207, the beamformee obtains a subcarrier beamforming matrix $V_{SC}$ from the equivalent channel $\tilde{H}_k$. In one embodiment, the subcarrier beamforming matrix $V_{SC}$ may be quantized as a quantized beamforming matrix of K×Nc, where Nc is a number of columns of the quantized beamforming matrix.

At 209, the beamformee transmits the quantized beamforming matrix $V_{WB}$ and the quantized subcarrier beamforming matrix $V_{SC}$.

At 211, a beamformer receives the quantized beamforming matrix $V_{WB}$ and the quantized subcarrier beamforming matrix $V_{SC}$.

At 213, the beamformer, constructs a beamforming matrix based on the received quantized beamforming matrix $V_{WB}$ and the quantized subcarrier beamforming matrix $V_{SC}$. Thus, 201 to 209 are performed by the beamformee and 211 and 213 are performed by the beamformer.

Figure 3:
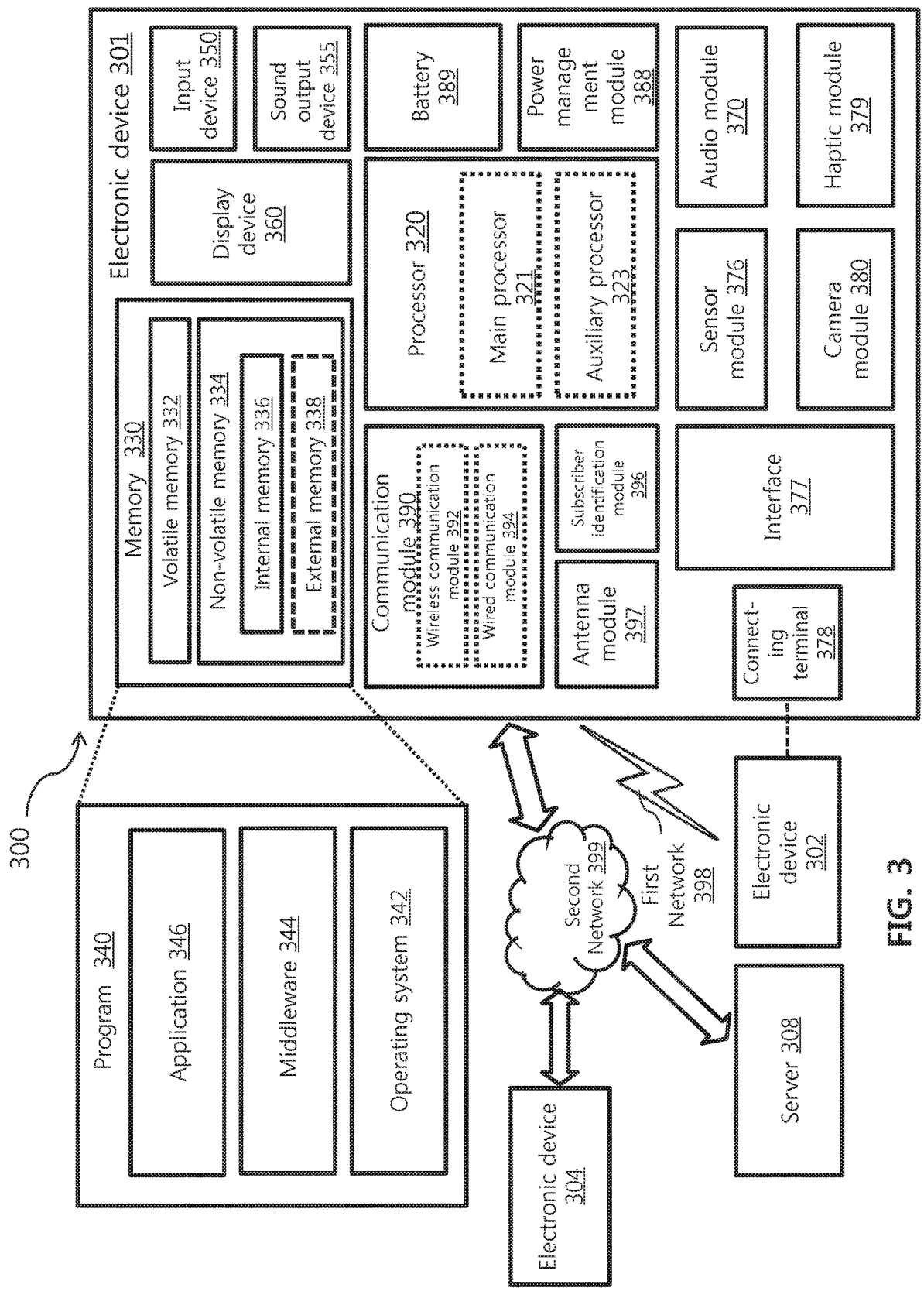
FIG. 3 is a block diagram of an electronic device in a network environment to which an apparatus and a method of the present disclosure is applied, according to one embodiment.

FIG. 3 is a block diagram illustrating an electronic device 301 in a network environment 300 according to various embodiments.

Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wired) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
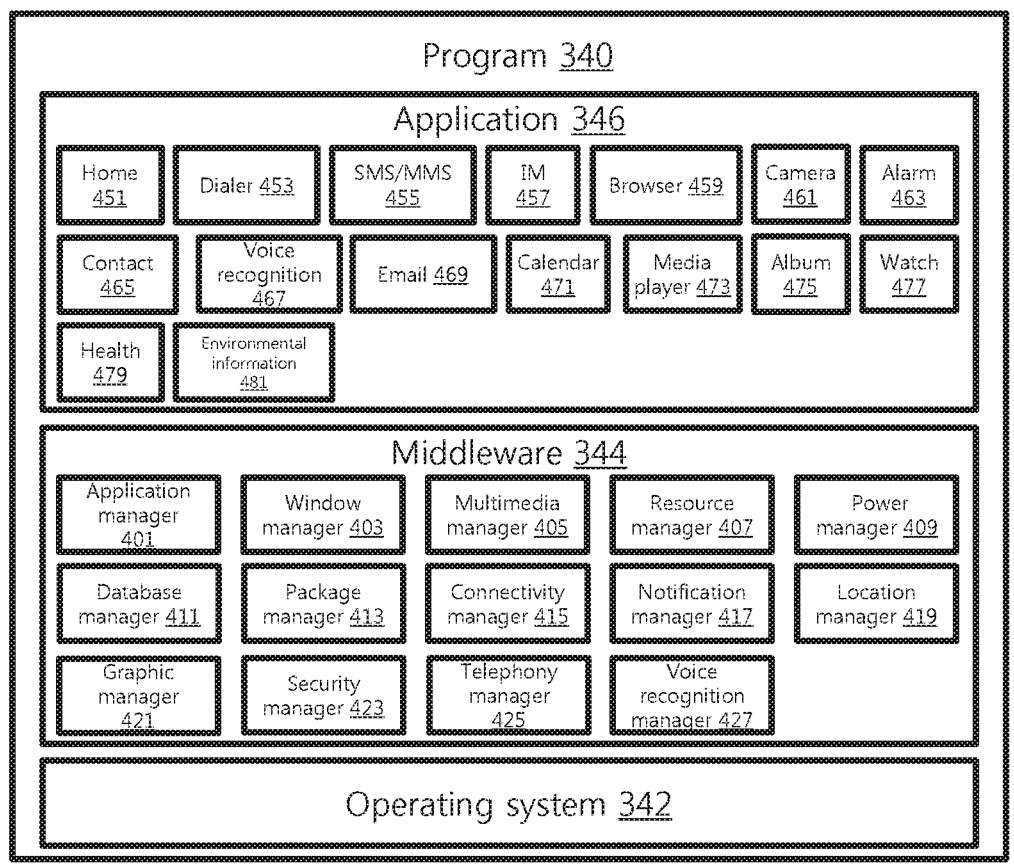
FIG. 4 is a block diagram of a program to which an apparatus and a method of the present disclosure is applied, according to one embodiment.

FIG. 4 is a block diagram of the program 340 according to one embodiment.

Referring to FIG. 4, the program 340 may include an OS 342 to control one or more resources of the electronic device 301, middleware 344, or an application 346 executable in the OS 342. The OS 342 may include, for example, Android®, iOS®, Windows®, Symbian®, Tizen®, or Bada™. At least part of the program 340, for example, may be pre-loaded on the electronic device 301 during manufacture, or may be downloaded from or updated by an external electronic device (e.g., the electronic device 302 or 304, or the server 308) during use by a user.

The OS 342 may control management (e.g., allocating or deallocation) of one or more system resources (e.g., process, memory, or power source) of the electronic device 301. The OS 342, additionally or alternatively, may include one or more driver programs to drive other hardware devices of the electronic device 301, for example, the input device 350, the sound output device 355, the display device 360, the audio module 370, the sensor module 376, the interface 377, the haptic module 379, the camera module 380, the power management module 388, the battery 389, the communication module 390, the subscriber identification module 396, or the antenna module 397.

The middleware 344 may provide various functions to the application 346 such that a function or information provided from one or more resources of the electronic device 301 may be used by the application 346. The middleware 344 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 346. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 346 or a memory space of the memory 330. The power manager 409, for example, may manage the capacity, temperature, or power of the battery 389, and determine or provide related information to be used for the operation of the electronic device 301 based at least in part on corresponding information of the capacity, temperature, or power of the battery 389. According to one embodiment, the power manager 409 may interoperate with a basic input/output system (BIOS) of the electronic device 301.

The database manager 411, for example, may generate, search, or change a database to be used by the application 346. The package manager 413, for example, may manage installation or update of an application that is distributed in the form of a package file. The connectivity manager 415, for example, may manage a wireless connection or a direct connection between the electronic device 301 and the external electronic device. The notification manager 417, for example, may provide a function to notify a user of an occurrence of a specified event (e.g., an incoming call, message, or alert). The location manager 419, for example, may manage locational information on the electronic device 301. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 301. The voice recognition manager 427, for example, may transmit a user's voice data to the server 308, and receive, from the server 308, a command corresponding to a function to be executed on the electronic device 301 based at least in part on the voice data, or text data converted based at least in part on the voice data. According to one embodiment, the middleware 344 may dynamically delete some existing components or add new components. According to one embodiment, at least part of the middleware 344 may be included as part of the OS 342 or may be implemented in other software separate from the OS 342.

The application 346 may include, for example, a home application 451, a dialer application 453, a short message service (SMS)/multimedia messaging service (MMS) application 455, an instant message (IM) application 457, a browser application 459, a camera application 461, an alarm application 463, a contact application 465, a voice recognition application 467, an email application 469, a calendar application 471, a media player application 473, an album application 475, a watch application 477, a health application 479 (e.g., for measuring the degree of workout or biometric information, such as blood sugar), or an environmental information application 481 (e.g., for measuring air pressure, humidity, or temperature information). According to one embodiment, the application 346 may further include an information exchanging application that is capable of supporting information exchange between the electronic device 301 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 769) of the electronic device 301 to the external electronic device. Additionally or alternatively, the notification relay application may receive notification information from the external electronic device and provide the notification information to a user of the electronic device 301.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 5:
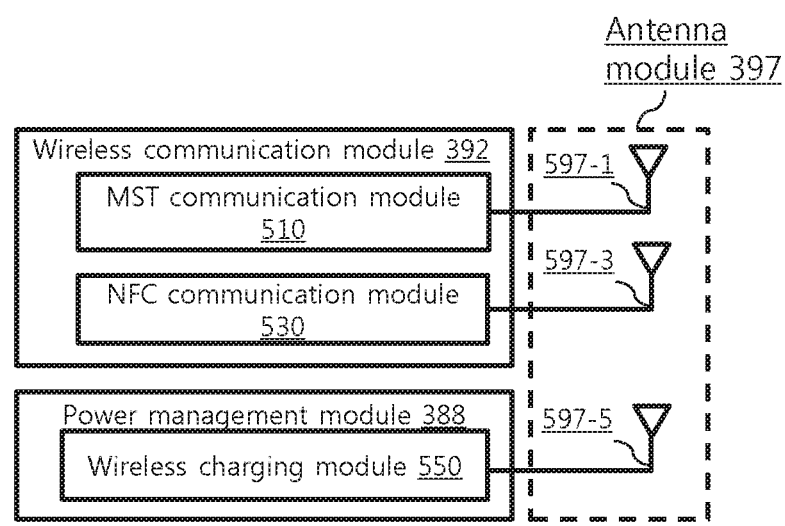
FIG. 5 is a block diagram of a wireless communication module, a power management module, and an antenna module of an electronic device to which an apparatus and a method of the present disclosure is applied, according to one embodiment, according to one embodiment.

FIG. 5 is a block diagram of the wireless communication module 392, the power management module 388, and the antenna module 397 of the electronic device 301, according to one embodiment.

Referring to FIG. 5, the wireless communication module 392 may include a magnetic secure transmission (MST) communication module 510 or a near-field communication (NFC) module 530, and the power management module 388 may include a wireless charging module 550. In this case, the antenna module 397 may include a plurality of antennas that include an MST antenna 597-1 connected with the MST communication module 510, an NFC antenna 597-3 connected with the NFC communication module 530, and a wireless charging antenna 597-5 connected with the wireless charging module 550. Descriptions of components described above with regard to FIG. 3 are either briefly described or omitted here.

The MST communication module 510 may receive a signal containing control information or payment information such as card (e.g., credit card) information from the processor 320, generate a magnetic signal corresponding to the received signal, and then transfer the generated magnetic signal to the external electronic device 302 (e.g., a point-of-sale (POS) device) via the MST antenna 597-1. To generate the magnetic signal, according to one embodiment, the MST communication module 510 may include a switching module that includes one or more switches connected with the MST antenna 597-1, and control the switching module to change the direction of voltage or current supplied to the MST antenna 597-1 according to the received signal. The change of the direction of the voltage or current allows the direction of the magnetic signal (e.g., a magnetic field) emitted from the MST antenna 597-1 to change accordingly. If detected at the external electronic device 302, the magnetic signal with its direction changing may cause an effect (e.g., a waveform) similar to that of a magnetic field that is generated when a magnetic card corresponding to the card information associated with the received signal is swiped through a card reader of the electronic device 302. According to one embodiment, for example, payment-related information and a control signal that are received by the electronic device 302 in the form of the magnetic signal may be further transmitted to an external server 308 (e.g., a payment server) via the network 399.

The NFC communication module 530 may obtain a signal containing control information or payment information such as card information from the processor 320 and transmit the obtained signal to the external electronic device 302 via the NFC antenna 597-3. According to one embodiment, the NFC communication module 530 may receive such a signal transmitted from the external electronic device 302 via the NFC antenna 597-3.

The wireless charging module 550 may wirelessly transmit power to the external electronic device 302 (e.g., a cellular phone or wearable device) via the wireless charging antenna 597-5, or wirelessly receive power from the external electronic device 302 (e.g., a wireless charging device). The wireless charging module 550 may support one or more of various wireless charging schemes including, for example, a magnetic resonance scheme or a magnetic induction scheme.

According to one embodiment, some of the MST antenna 597-1, the NFC antenna 597-3, or the wireless charging antenna 597-5 may share at least part of their radiators. For example, the radiator of the MST antenna 597-1 may be used as the radiator of the NFC antenna 597-3 or the wireless charging antenna 597-5, or vice versa. In this case, the antenna module 397 may include a switching circuit adapted to selectively connect (e.g., close) or disconnect (e.g., open) at least part of the antennas 597-1, 597-3, and 597-5, for example, under control of the wireless communication module 392 (e.g., the MST communication module 510 or the NFC communication module 530) or the power management module (e.g., the wireless charging module 550). For example, when the electronic device 301 uses a wireless charging function, the NFC communication module 530 or the wireless charging module 550 may control the switching circuit to temporarily disconnect at least one portion of the radiators shared by the NFC antenna 597-3 and the wireless charging antenna 597-5 from the NFC antenna 597-3 and to connect the at least one portion of the radiators with the wireless charging antenna 597-5.

According to one embodiment, at least one function of the MST communication module 510, the NFC communication module 530, or the wireless charging module 550 may be controlled by an external processor (e.g., the processor 320). According to one embodiment, at least one specified function (e.g., a payment function) of the MST communication module 510 or the NFC communication module 530 may be performed in a trusted execution environment (TEE). According to one embodiment, the TEE may form an execution environment in which, for example, at least some designated area of the memory 530 is allocated to be used for performing a function (e.g., a financial transaction or personal information-related function) that requires a relatively high level of security. In this case, access to the at least some designated area of the memory 330 may be restrictively permitted, for example, according to an entity accessing thereto or an application being executed in the TEE.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus for a beamformee, comprising:
a first beamforming matrix device configured to generate a first beamforming matrix $V_{WB}$ from a channel H;
an equivalent channel device configured to generate an equivalent channel $\tilde{H}_k$ based on the channel H and the first beamforming matrix $V_{WB}$, where k is a number that indicates a subcarrier index;
a second beamforming matrix device configured to obtain a second beamforming matrix $V_{SC}$ from the equivalent channel $\tilde{H}_k$; and
a transmitter configured to transmit the first beamforming matrix $V_{WB}$ and the second beamforming matrix $V_{SC}$.

2. The apparatus of claim 1, further comprising a channel estimator configured to estimate the channel H.

3. The apparatus of claim 1, wherein the first beamforming matrix $V_{WB}$ has dimension $N_{TX} \times K$, where $N_{TX}$ is a number of transmit antennas of the apparatus, and where K is a number.

4. The apparatus of claim 1, wherein the first beamforming matrix $V_{WB}$ is a matrix having K most significant vectors in a right singular matrix, where K is a number.

5. The apparatus of claim 4, wherein the first beamforming matrix device is further configured to quantize the first beamforming matrix $V_{WB}$ based on the covariance matrix of the channel H.

6. The apparatus of claim 5, wherein the second beamforming matrix device is further configured to quantize the second beamforming matrix $V_{SC}$ as a quantized beamforming matrix of $K \times Nc$, where K is a number, and where Nc is a number of columns of the quantized beamforming matrix.

7. The apparatus of claim 1, wherein the first beamforming matrix device is further configured to determine the first beamforming matrix $V_{WB}$ based on a covariance matrix of the channel H.

8. The apparatus of claim 7, wherein the first beamforming matrix device is further configured to quantize the first beamforming matrix $V_{WB}$ by single value decomposition (SVD).

9. The apparatus of claim 1, wherein the equivalent channel device is further configured to determine the equivalent channel $\tilde{H}_k$ by multiplying $H_k$ by the first beamforming matrix $V_{WB}$, where $H_k$ is the channel H at the subcarrier index k.

10. The apparatus of claim 1, wherein the first beamforming matrix $V_{WB}$ is generated to be wideband from a bandwidth that depends on a channel condition and a multiple-input-multiple-output (MIMO) mode.

11. A method, comprising:
determining, by a beamformee, a first beamforming matrix $V_{WB}$ from a channel H;
determining, by the beamformee, an equivalent channel $\tilde{H}_k$ based on the channel H and the first beamforming matrix $V_{WB}$, where k is a number that indicates a subcarrier index;

obtaining, by the beamformee, a second beamforming matrix $V_{SC}$ from the equivalent channel $\tilde{H}_k$; and transmitting, by the beamformee, to a beamformer, the first beamforming matrix $V_{WB}$ and the second beamforming matrix $V_{SC}$.

12. The method of claim 11 further comprising estimating, by the beamformee, the channel H.

13. The method of claim 11, wherein the first beamforming matrix $V_{WB}$ has dimension $N_{TX} \times K$, where $N_{TX}$ is a number of transmit antennas of the beamformer, and where K is a number.

14. The method of claim 11, wherein the first beamforming matrix $V_{WB}$ is a matrix having K most significant vectors in a right singular matrix, where K is a number.

15. The method of claim 14, wherein the first beamforming matrix $V_{WB}$ is quantized based on the covariance matrix of the channel H.

16. A method of claim 15, wherein the second beamforming matrix $V_{SC}$ is quantized as a quantized beamforming matrix of K×Nc, where K is a number, and where Nc is a number of columns of the quantized beamforming matrix.

17. The method of claim 11, wherein the first beamforming matrix $V_{WB}$ is determined based on a covariance matrix of the channel H.

18. The method of claim 17, wherein the first beamforming matrix $V_{WB}$ is quantized by single value decomposition (SVD).

19. The method of claim 11, wherein the equivalent channel $\tilde{H}_k$ is determined by multiplying $H_k$ by the first beamforming matrix $V_{WB}$, where $H_k$ is the channel H at the subcarrier index k.

20. The method of claim 11, wherein the first beamforming matrix $V_{WB}$ is generated to be wideband from a bandwidth that depends on a channel condition and a multiple-input-multiple-output (MIMO) mode.

* * * * *